United States Patent
Chen et al.

(10) Patent No.: US 12,541,021 B2
(45) Date of Patent: Feb. 3, 2026

(54) METHOD AND APPARATUS OF TRAINING RADIATION IMAGE RECOGNITION MODEL ONLINE, AND METHOD AND APPARATUS OF RECOGNIZING RADIATION IMAGE

(71) Applicants: NUCTECH COMPANY LIMITED, Beijing (CN); Tsinghua University, Beijing (CN)

(72) Inventors: Zhiqiang Chen, Beijing (CN); Li Zhang, Beijing (CN); Ao Zheng, Beijing (CN); Ji Zhao, Beijing (CN); Hu Tang, Beijing (CN); Yunda Sun, Beijing (CN); Lei Lei, Beijing (CN); Shuo Wang, Beijing (CN)

(73) Assignees: NUCTECH COMPANY LIMITED, Beijing (CN); Tsinghua University, Beijing (CN)

( * ) Notice: Subject to any disclaimer, the term of this patent is extended or adjusted under 35 U.S.C. 154(b) by 352 days.

(21) Appl. No.: 18/139,411

(22) Filed: Apr. 26, 2023

(65) Prior Publication Data

US 2023/0350053 A1 Nov. 2, 2023

(30) Foreign Application Priority Data

Apr. 29, 2022 (CN) .......................... 202210478943.X

(51) Int. Cl.
*G01S 13/88* (2006.01)
*G06T 5/50* (2006.01)
(Continued)

(52) U.S. Cl.
CPC .............. *G01S 13/887* (2013.01); *G06T 5/50* (2013.01); *G06T 7/62* (2017.01); *G06T 7/70* (2017.01);
(Continued)

(58) Field of Classification Search
CPC .......... G01S 13/887; G06T 5/50; G06T 7/62; G06T 7/70; G06T 2207/20081;
(Continued)

(56) References Cited

U.S. PATENT DOCUMENTS

2022/0101526 A1 3/2022 Lerch et al.
2023/0306085 A1* 9/2023 Paglieroni ................ G06N 3/09

FOREIGN PATENT DOCUMENTS

CN 103795976 A 5/2014
CN 110119734 A 8/2019
(Continued)

OTHER PUBLICATIONS

Search report and Written Opinion dated Jun. 12, 2024 issued from the Netherlands Patent Office for corresponding Dutch Application No. 2034690 (12 pages including English Translation).
(Continued)

*Primary Examiner* — Tom Y Lu
(74) *Attorney, Agent, or Firm* — Merchant & Gould P.C.

(57) ABSTRACT

Provided are a method and an apparatus of training a radiation image recognition model online and a method and an apparatus of recognizing a radiation image. Preset data is pre-stored in a radiation inspection system, and the preset data includes a first radiation image. The method of training radiation image recognition model online includes: collecting a second radiation image at the radiation inspection site; labeling the second radiation image online to form on-site collected data having a second labeling information, wherein the second labeling information is an incomplete labeling information of the second radiation image, and the second labeling information is used to indicate at least one of objects of interest in the second radiation image; synthesizing the preset data and the on-site collected data online to
(Continued)

form a training data set; and training the radiation image recognition model online using the training data set.

19 Claims, 10 Drawing Sheets

(51) Int. Cl.
*G06T 7/62* (2017.01)
*G06T 7/70* (2017.01)
*G06V 10/74* (2022.01)
*G06V 20/70* (2022.01)

(52) U.S. Cl.
CPC ............ *G06V 10/761* (2022.01); *G06V 20/70* (2022.01); *G06T 2207/20081* (2013.01); *G06T 2207/20104* (2013.01); *G06T 2207/20221* (2013.01); *G06V 2201/07* (2022.01)

(58) Field of Classification Search
CPC .......... G06T 2207/20104; G06T 2207/20221; G06V 10/761; G06V 20/70; G06V 2201/07; G06V 20/52; G06V 10/774; G06V 10/82; G06V 10/25; G06V 10/764; G06V 10/771; G06V 2201/03; A61B 6/5205; A61B 6/032; Y04S 10/50; G06N 3/0464

See application file for complete search history.

(56) References Cited

FOREIGN PATENT DOCUMENTS

| CN | 110210739 | A | 9/2019 | |
|---|---|---|---|---|
| CN | 112001846 | * | 11/2020 | ............ G06T 3/4046 |
| CN | 112444889 | A | 3/2021 | |
| CN | 112884085 | A | 6/2021 | |
| CN | 113920419 | A | 1/2022 | |
| EP | 3982327 | A1 | 4/2022 | |
| GB | 2580629 | A * | 7/2020 | ............ G06V 20/00 |

OTHER PUBLICATIONS

Rogers Thomas W, et al "Threat Image Projection (TIP) into X-ray images of cargo containers for training humans and machines", IEEE International Carnahan Conference on Security Technology (ICCST), 2016, XP033040792, DOI: 10.1109/CCST.2016.7815717 (12 pages).
Hangzhou Hikvision Digital Technology Co., Ltd.: "X-Ray Security Inspection System User's Manual", 2019, XP93160547, URL:https:// www.hikvision.com/content/dam/hikvision/products/S000000001/ S000002016/000002036/S000002057/OFR003119/M000019669/ User_Manual/X-Ray-Security-Inspection-System_usermanualwin2019. pdf (87 pages).
Caldwell M et al, "Transferring X-ray based automated threat detection between scanners with different energies and resolution" Proceedings of SPIE, 2017, vol. 10441, XP060096062, DOI: 10.1117/ 12.2277641 (10 pages).
Kim Hyo-Young, et al., "Learning-Based Image Synthesis for Hazardous Object Detection in X-Ray Security Applications", IEEE Access, 2021, XP011882138, DOI: 10.1109/ACCESS.2021. 3116255, (10 pages).
International Search Report PCT application No. PCT/CN2023/ 078682 issued on Apr. 3, 2023 (3 pages).
First Office Action regarding corresponding Chinese Patent Application No. CN202210478943.X issued on Mar. 1, 2024 (14 pages including English Translation).
Office Action regarding corresponding Japanese Patent Application No. 2023-071395 issued on Mar. 5, 2024 (6 pages including English Translation).
Ulrich Neitzel et al., "Determination of the detective quantum efficieny of a digital x-ray detector: Comparison of three evaluations using a common image data set", Med. Phys., 2004, 31:8, pp. 2205-2211.

* cited by examiner

METHOD AND APPARATUS OF TRAINING RADIATION IMAGE RECOGNITION MODEL ONLINE, AND METHOD AND APPARATUS OF RECOGNIZING RADIATION IMAGE

CROSS-REFERENCE TO RELATED APPLICATION

This application claims the priority of Chinese Patent Application No. 202210478943.X filed on Apr. 29, 2022 in the China National Intellectual Property Administration, the content of which is incorporated herein by reference in entirety.

TECHNICAL FIELD

The present disclosure relates to a field of an image processing technology, and in particular, to a method and an apparatus of training a radiation image recognition model online, a method and an apparatus of recognizing a radiation image, an electronic device, a computer-readable storage medium and a program product.

BACKGROUND

A wide application of a radiation imaging technology has brought a great convenience to a recognition of special items. However, a rapid increase in the number of packages and requirements for a passing rate have brought a great pressure on a traditional manual identification of images, and thus a more automatic recognition method is urgently needed. A radiation image intelligent recognition technology emerges as the times require. The technology automatically recognizes and alarms a collected radiation image using a deep-learning-based target detection method, which may greatly reduce a human burden.

At present, after a deep-learning-based method of recognizing a radiation image is deployed to a radiation inspection site, whenever needs of a user change, it is required to return data collected on site to a developer of a radiation image intelligent recognition system. The data is manually labeled by the developer, a model training is performed based on a result of manual labeling, and then the trained model is updated to the radiation inspection site before on-site use. The set of processes have a long implementation cycle and a low efficiency, and may not meet needs of the user (i.e. an end user of the radiation image intelligent recognition system) for data confidentiality. In addition, a huge amount of data is collected at the radiation inspection site. An existing labeling method needs to label all objects of all categories of interest, which may result in a more manpower for a labeling work and a low labeling efficiency.

The above-mentioned information disclosed in the section is only used to understand the background of the inventive concept of the present disclosure. Therefore, the above-mentioned information may include an information that does not constitute the prior art.

SUMMARY

In view of at least one aspect of the above-mentioned technical problems, a method and an apparatus of training a radiation image recognition model online, a method and an apparatus of recognizing a radiation image, an electronic device, a computer-readable storage medium and a program product are proposed.

In an aspect, a method of training a radiation image recognition model online is provided. The radiation image recognition model is applied to a radiation inspection system, the radiation inspection system is arranged at a radiation inspection site, preset data is pre-stored in the radiation inspection system, and the preset data includes a first radiation image. The method includes:
  collecting a second radiation image at the radiation inspection site;
  labeling the second radiation image online to form on-site collected data having a second labeling information, wherein the second labeling information is an incomplete labeling information of the second radiation image, and the second labeling information is configured to indicate at least one of objects of interest in the second radiation image;
  synthesizing the preset data and the on-site collected data online to form a training data set; and
  training the radiation image recognition model online using the training data set.

According to some exemplary embodiments, the first radiation image in the preset data comprises at least one of following:
  the first radiation image in the preset data has a first labeling information, and the first labeling information is configured to indicate all objects of interest in the first radiation image;
  the first radiation image in the preset data does not include any object of interest; and
  the preset data includes a plurality of first radiation images, at least one of the plurality of first radiation images has the first labeling information, the first labeling information is configured to indicate all objects of interest in the first radiation image, and at least one of the plurality of first radiation images does not include any object of interest.

According to some exemplary embodiments, the synthesizing the preset data and the on-site collected data online to form a training data set includes:
  extracting an object of interest corresponding to the second labeling information from the second radiation image; and
  synthesizing the second labeling information and the extracted object of interest into the first radiation image included in the preset data to form the training data set.

According to some exemplary embodiments, the first labeling information is configured to indicate all objects of interest of all categories in the first radiation image. The second labeling information is configured to indicate objects of interest of at least one of categories in the second radiation image, or the second labeling information is configured to indicate at least one of objects of interest of at least one of categories in the second radiation image.

According to some exemplary embodiments, the first labeling information includes at least one first labeling box labeled in the first radiation image and at least one first tag labeled in the first radiation image, the at least one first labeling box is configured to indicate locations of all objects of interest in the first radiation image, and the at least one first tag is configured to indicate categories of all objects of interest in the first radiation image.

According to some exemplary embodiments, the second labeling information includes at least one second labeling box labeled in the second radiation image and at least one second tag labeled in the second radiation image, the at least one second labeling box is configured to indicate a location of at least one of objects of interest in the second radiation image, and the at least one second tag is configured to indicate a category of at least one of objects of interest in the second radiation image.

According to some exemplary embodiments, the synthesizing the second labeling information and the extracted object of interest into the first radiation image included in the preset data to form the training data set includes:

inserting the extracted object of interest into the first radiation image to form a training radiation image;

generating a third labeling box and a third tag in the training radiation image, wherein the third labeling box is generated according to the second labeling box, and the third tag is identical to the second tag and configured to indicate a category of an object of interest surrounded by the third labeling box; and forming the training data set according to the training radiation image having the first labeling box, the first tag, the third labeling box and the third tag.

According to some exemplary embodiments, the first radiation image includes a transparent region and an opaque region, and the inserting the extracted object of interest into the first radiation image to form a training radiation image includes:

selecting a region meeting an insertion requirement from the transparent region of the first radiation image as at least one candidate insertion region;

selecting one of the at least one candidate insertion region as an insertion region according to a data synthesis rule; and inserting the extracted object of interest into the insertion region.

According to some exemplary embodiments, the meeting an insertion requirement includes that: an area or a volume of the candidate insertion region is greater than or equal to an area or a volume of a to-be-inserted object of interest.

According to some exemplary embodiments, the data synthesis rule includes that: in the first radiation image, a concealment degree of a surrounding object to the candidate insertion region meets a specified requirement.

According to some exemplary embodiments, the method further includes:

forming a quasi-complete labeling information of the second radiation image according to the incomplete labeling information of the second radiation image; and determining the second radiation image having the quasi-complete labeling information as a portion of the training data set.

According to some exemplary embodiments, the forming a quasi-complete labeling information of the second radiation image according to the incomplete labeling information of the second radiation image includes:

detecting an unlabeled object of interest in the second radiation image;

calculating a similarity between the unlabeled object of interest and an object of interest corresponding to the second labeling information; and labeling, in response to the similarity meeting a similarity threshold requirement, the unlabeled object of interest using the second labeling information, so as to form the quasi-complete labeling information of the second radiation image.

According to some exemplary embodiments, the inserting the extracted object of interest into the first radiation image to form a training radiation image includes:

performing a data augmentation operation on the extracted object of interest to form augmentation data, wherein a number of extracted objects of interest is n, and a number of objects of interest included in the augmentation data is N, $N=m*n$, where n is a positive integer greater than or equal to 1, and m is a positive integer greater than or equal to 2; and inserting the N objects of interest included in the augmentation data into the first radiation image respectively, so as to form a plurality of training radiation images.

According to some exemplary embodiments, the data augmentation operation includes at least one selected from: a flip operation, a rotation operation, and a numerical dithering operation.

According to some exemplary embodiments, the training data set includes a first training data subset and a second training data subset, the first training data subset and the second training data subset have different data distributions, the first training data subset includes the preset data, and the second training data subset includes an unlabeled third radiation image collected at the radiation inspection site. The method further includes:

training the radiation image recognition model using the first training data subset; and training the radiation image recognition model trained by the first training data subset using the second training data subset, wherein in a process of training the radiation image recognition model trained by the first training data subset using the second training data subset, a distance between the first training data subset and the second training data subset is minimized by adjusting a parameter of a feature layer of the radiation image recognition model.

According to some exemplary embodiments, the preset data includes a typical sample in a radiation inspection, and the typical sample is screened by a genetic method.

According to some exemplary embodiments, the labeling the second radiation image online includes:

automatically detecting an object of interest of an unknown category in the second radiation image; and sending a reminder signal, wherein the reminder signal is configured to remind to label the object of interest of the unknown category in the second radiation image.

According to some exemplary embodiments, the training the radiation image recognition model online using the training data set includes:

training a plurality of alternative models using the training data set;

screening the plurality of alternative models according to a specified index; and determining one of the plurality of alternative models meeting the specified index as the radiation image recognition model.

In another aspect, a method of recognizing a radiation image is provided. The method of recognizing the radiation image is applied to a radiation inspection system, and the radiation inspection system is arranged at a radiation inspection site. The method includes:

collecting a to-be-recognized radiation image at the radiation inspection site;

inputting the to-be-recognized radiation image into a radiation image recognition model, wherein the radiation image recognition model is trained according to the method as described above; and recognizing the to-be-recognized radiation image using the radiation image recognition model.

In yet another aspect, an apparatus of training a radiation image recognition model online is provided. The radiation image recognition model is applied to a radiation inspection system, the radiation inspection system is arranged at a radiation inspection site, preset data is pre-stored in the radiation inspection system, and the preset data includes a first radiation image. The apparatus includes:

a collecting module configured to collect a second radiation image at the radiation inspection site;

an online labeling module configured to label the second radiation image online to form on-site collected data having a second labeling information, wherein the second labeling information is an incomplete labeling information of the second radiation image, and the second labeling information is configured to indicate at least one of objects of interest in the second radiation image;

an online synthesis module configured to synthesize the preset data and the on-site collected data online to form a training data set; and a training module configured to train the radiation image recognition model online using the training data set.

According to some exemplary embodiments, the synthesizing the preset data and the on-site collected data online to form a training data set includes:

extracting an object of interest corresponding to the second labeling information from the second radiation image; and synthesizing the second labeling information and the extracted object of interest into the first radiation image included in the preset data to form the training data set.

In yet another aspect, an apparatus of recognizing a radiation image is provided. The apparatus of recognizing the radiation image is applied to a radiation inspection system, and the radiation inspection system is arranged at a radiation inspection site. The apparatus includes:

a collecting module configured to collect a to-be-recognized radiation image at the radiation inspection site;

an input module configured to input the to-be-recognized radiation image into a radiation image recognition model, wherein the radiation image recognition model is trained according to the method as described above; and a recognition module configured to recognize the to-be-recognized radiation image using the radiation image recognition model.

In yet another aspect, an electronic device is provided, including:

one or more processors;

a storage apparatus configured to store one or more programs, wherein the one or more programs, when executed by the one or more processors, are configured to cause the one or more processors to implement the method as described above.

According to some exemplary embodiments, the electronic device is a radiation inspection device.

In yet another aspect, a computer-readable storage medium having executable instructions thereon. The instructions, when executed by a processor, are configured to cause the processor to implement the method as described above.

In yet another aspect, a computer program product including a computer program is provided. The computer program, when executed by a processor, is configured to cause the processor to implement the method as described above.

BRIEF DESCRIPTION OF THE DRAWINGS

In order to better understand the present disclosure, the present disclosure will be described in detail according to following accompanying drawings.

DETAILED DESCRIPTION OF EMBODIMENTS

Figure 1:
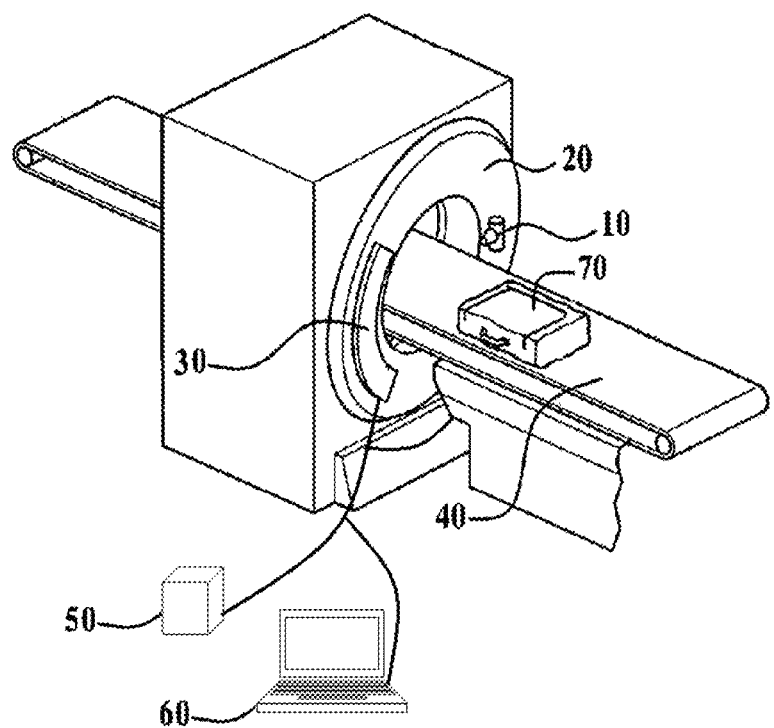
FIG. 1 shows a structural schematic diagram of a radiation inspection system according to embodiments of the present disclosure.

Specific embodiments of the present disclosure will be described below in detail. It should be noted that embodiments described here are only for illustration and are not intended to limit the present disclosure. In the following descriptions, in order to provide a thorough understanding of the present disclosure, a large number of specific details are described. However, it is obvious to those skilled in the art that it is not necessary to use these specific details to implement the present disclosure. In other examples, in order to avoid confusion of the present disclosure, well-known structures, materials or methods are not specifically described.

In the entire specification, reference to "an embodiment", "embodiments", "an example" or "examples" means that specific features, structures or characteristics described in combination with the embodiment(s) or example(s) are included in at least one embodiment of the present disclosure. Therefore, terms "in an embodiment", "in embodiments", "an example" or "examples" described in the entire specification do not necessarily refer to the same embodiment or example. In addition, the specific features, structures or characteristics may be combined in one or more embodiments or examples in any suitable combination and/or sub-combination. In addition, those skilled in the art should understand that a term "and/or" used herein includes any and all combinations of one or more related listed items.

Terms used herein are only intended to describe specific embodiments and are not intended to limit the present disclosure. Terms "include", "comprise", "contain", etc. used herein indicate the presence of the described features, steps, operations and/or components, but do not exclude the presence or addition of one or more other features, steps, operations and/or components.

All terms (including technical and scientific terms) used herein have meanings generally understood by those of ordinary skilled in the art, unless otherwise defined. It should be noted that the terms used herein should be interpreted as having the meaning consistent with the context of the present disclosure, and should not be interpreted in an idealized or overly rigid manner.

The inventor found through research that a wide application of a radiation imaging technology has brought a great convenience to a recognition of special items. However, a rapid increase in the number of packages and requirements for a passing rate have brought a great pressure on a traditional manual image recognition, and thus a more automatic recognition method is urgently needed.

With a rapid development of a GPU hardware technology, a deep learning method has entered all walks of life, and an emergence of the method has innovatively changed a basic research method of the industry. As a basis of the deep learning method—an artificial neural network, the concept of a basic unit "neuron" of the artificial neural network has been well known. In an early stage of a development of a neural network, adjacent neurons are generally connected in a fully connected way. However, for an image processing task, a demand of the connection method for a parameter quantity is extremely large and unacceptable. In order to solve the problem, inspired by local perception characteristics of a biological vision model, a convolutional neural network model is proposed. The model may greatly reduce a network parameter quantity and make it possible to process a complex computer vision task by introducing a convolution calculation method and taking advantage of characteristics of local connection and weight sharing.

In a field of computer vision, an important application scenario of the deep learning method is a target detection. That is, for an input image, an algorithm may give a location information (a bounding box or an edge contour) of an object and a category to which the object belongs, which may have an important application in a contraband identification, an automatic driving, an anomaly detection, etc. For a problem of target detection, a classic solution includes a two-stage method with a high accuracy—an RCNN series, and a one-stage method with a high speed—an SSD and YOLO series. In recent years, many researchers have made improvements based on the methods and proposed a variety of variant methods to give consideration to a detection effect and a detection speed.

With a development of the radiation imaging technology and a deep learning technology, a radiation image intelligent recognition technology emerges as the times require. The technology automatically recognizes and alarms a collected radiation image by using a deep-learning-based target detection method, which may greatly reduce a human burden. For example, a CT scanning technology detects an internal three-dimensional structure information of an object by using a ray, has an ability of detecting an internal structure of the object in a low cost, non-destructive and intuitive way, and achieves a remarkable result in many fields such as a medical imaging, a safety inspection, an industrial flaw detection, etc. A dual-energy material recognition technology for security CT may distinguish a material information of an object such as an atomic number, etc., which greatly improve an ability of dangerous goods detection. A wide application of the CT technology has brought a great convenience to the recognition of special items. However, the rapid increase in the number of packages and the requirements for the passing rate have brought a great pressure on the traditional manual identification of images, and thus a more automatic recognition method is urgently needed. A CT intelligent recognition technology emerges as the times require. The technology automatically recognizes and alarms CT scan data by using the deep-learning-based target detection method, which may greatly reduce the human burden.

The inventor found that, in a practical application process, a deep-learning-based radiation image intelligent recognition technology has at least one of following problems:

(1) After a radiation image intelligent recognition system is deployed to a radiation inspection site, whenever needs of a user change, it is required to return data collected on site to a developer of the radiation image intelligent recognition system. The data is manually labeled by the developer, a model training is performed based on a result of manual labeling, and then the trained model is updated to the radiation inspection site before on-site use. The set of processes have a long implementation cycle and a low efficiency, and may not meet needs of the user (i.e. an end user of the radiation image intelligent recognition system) for data confidentiality.

(2) A huge amount of data is collected at the radiation inspection site. An existing labeling method needs to label all objects of all categories of interest, which may result in a more manpower of a labeling work and a low labeling efficiency. If all objects of all categories of interest that need to be labeled are not labeled, a problem of not making full use of the on-site collected data may occur.

(3) With a continuous change of user needs and an impact of some emergencies in a process of on-site use, categories of objects that need to be detected may continue to be updated. An existing radiation image intelligent recognition system may not flexibly and conveniently add detectable categories on an original basis according to the user needs.

(4) A distribution of data collected at different use sites is not the same, which is specifically reflected in different categories of objects, quantity distribution, etc. The existing radiation image intelligent recognition system may not adjust a model to a best detection effect according to the on-site data.

In order to solve at least one aspect of the above-mentioned problems, embodiments of the present disclosure provide a method of training a radiation image recognition model online. The radiation image recognition model is applied to a radiation inspection system, the radiation inspection system is arranged at a radiation inspection site, preset data is pre-stored in the radiation inspection system, and the preset data includes a first radiation image. The method includes: collecting a second radiation image at the radiation inspection site; labeling the second radiation image online to form on-site collected data having a second labeling information, wherein the second labeling information is an incomplete labeling information of the second radiation image, and the second labeling information is used to indicate at least one of objects of interest in the second radiation image; synthesizing the preset data and the on-site collected data online to form a training data set; and training the radiation image recognition model online using the training data set.

In embodiments of the present disclosure, incomplete labeling data collected on site may be directly used to eliminate a negative impact of the incomplete labeling data, which may greatly reduce a labeling burden of a user. Specifically, data with an incomplete or extremely incomplete labeling may be used, that is, each category in a data set does not need to be completely labeled, or only some objects of a category of interest in an image may be labeled, so as to minimize the labeling burden and improve a robustness of a system. In addition, it may be ensured that data collected on site does not go out of the site, that is, the data collected on site does not need to be returned, so that confidentiality requirements of the user may be met.

Embodiments of the present disclosure further provide a method of recognizing a radiation image. The method of recognizing the radiation image is applied to a radiation inspection system, the radiation inspection system is arranged at a radiation inspection site. The method includes: a to-be-recognized radiation image at the radiation inspection site; inputting the to-be-recognized radiation image into a radiation image recognition model, wherein the radiation image recognition model is trained according to the method as described above; and recognizing the to-be-recognized radiation image using the radiation image recognition model.

In embodiments of the present disclosure, an accuracy of recognizing the radiation image may be improved by using the radiation image recognition model trained by a large number of on-site collected data.

Next, embodiments of the present disclosure will be described in detail by taking a CT radiation inspection as an example. It should be understood that embodiments of the present disclosure are not limited to a CT radiation inspection scenario, but may be applied to various radiation inspection scenarios, for example, an X-ray machine security inspection, a terahertz (millimeter wave) human security inspection, etc. For another example, embodiments of the present disclosure may be applied to a radiation inspection scenario including various inspection objects, including but not limited to a vehicle radiation inspection, a baggage/package radiation inspection, a human radiation inspection, etc. It should be noted that the descriptions of the radiation inspection scenarios here are not exhaustive, and the descriptions here should not be construed as limiting the scope of protection of the present disclosure.

It should be noted that embodiments of the present disclosure are not limited to a target detection task, but may also be applied to tasks such as an image classification, an image segmentation, etc. Similarly, a dimension of data is not limited for a detected object, which may be three-dimensional data for example in following embodiments, or two-dimensional data, pseudo three-dimensional data (depth data), etc. Thus, unless otherwise stated, an expression "image recognition" used herein includes but is not limited to various tasks such as a target detection, an image classification, an image segmentation, etc.

FIG. 1 shows a structural schematic diagram of a radiation inspection system according to embodiments of the present disclosure. In FIG. 1, a CT scanning apparatus is schematically shown as an example of the radiation inspection system. As shown in FIG. 1, the CT scanning apparatus according to the embodiments includes: a rack 20, a bearing mechanism 40, a controller 50, a data processor 60 (e.g., a computer), etc. The rack 20 includes a ray source 10 that emits an inspection X-ray, such as an X-ray machine, and a detecting and collecting apparatus 30. The bearing mechanism 40 carries an inspected object (e.g., a checked baggage) 70 through a scanning region between the ray source 10 and the detecting and collecting apparatus 30 of the rack 20, and the rack 20 rotates around a forward direction of the inspected object 70, so that a ray emitted by the ray source 10 may pass through the inspected object 70 and perform a CT scanning on the inspected object 70. For example, the detecting and collecting apparatus 30 is a detector and a data collector with an integral modular structure, such as a flat panel detector, which is used to detect and transmit a ray of an inspected liquid object, acquire an analog signal, and convert the analog signal into a digital signal, so as to output projection data of the inspected object 70 for the X-ray. The controller 50 is used to control all parts of the whole system to work synchronously. The data processor 60 is used to process data collected by the data collector, process and reconstruct the data, and output a result.

As shown in FIG. 1, the ray source 10 is placed on a side where the inspected object may be placed. The detecting and collecting apparatus 30 is placed on the other side of the inspected object 70, and includes the detector and the data collector, which are used to obtain transmission data and/or multi-angle projection data of the inspected object 70. The data collector includes a data amplification and shaping circuit, which may work in a (current) integration mode or pulse (counting) mode. A data output cable of the detecting and collecting apparatus 30 is connected to the controller 50 and the data processor 60, and collected data is stored in the data processor 60 according to a trigger command.

In embodiments of the present disclosure, a radiation image recognition system 80 may be deployed in the data processor 60, and a radiation image recognition model may be deployed in the radiation image recognition system 80. The radiation image recognition system 80 may recognize collected on-site data (e.g., a radiation image) by using the radiation image recognition model. The recognition may include a target detection, for example, detecting an object of interest in the radiation image. For example, the object of interest may be all kinds of contraband. It should be understood that a specific category of the object of interest depends on a radiation inspection site arranged by the radiation inspection system, or that a specific category of the object of interest is determined by an end user (also referred to herein as a user) of the radiation inspection system according to specific radiation inspection needs, which may be dynamically adjusted according to radiation inspection needs.

In embodiments of the present disclosure, for example, the ray source 10 may be an X-ray machine, and an appropriate focus size of the X-ray machine may be selected according to an imaging resolution. In other embodiments, an X-ray beam may be generated by using a linear accelerator instead of using the X-ray machine.

The detecting and collecting apparatus 30 includes an X-ray detector, a data collecting circuit, etc. The X-ray detector may use a solid detector, and may use a gas detector or other detectors. Embodiments of the present disclosure are not limited to this. The data collecting circuit includes a readout circuit, a collecting trigger circuit, a data transmission circuit, etc.

For example, a combination of the controller 50 and the data processor 60 includes a computer device installed with a control program and a data processing program, which is responsible for controlling an operation process of the CT scanning apparatus, including a mechanical rotation, an electrical control, a safety interlock control, etc. A CT image is reconstructed from projection data, the radiation image recognition model is trained, and the radiation image is recognized using the trained radiation image recognition model, etc.

Figure 2:
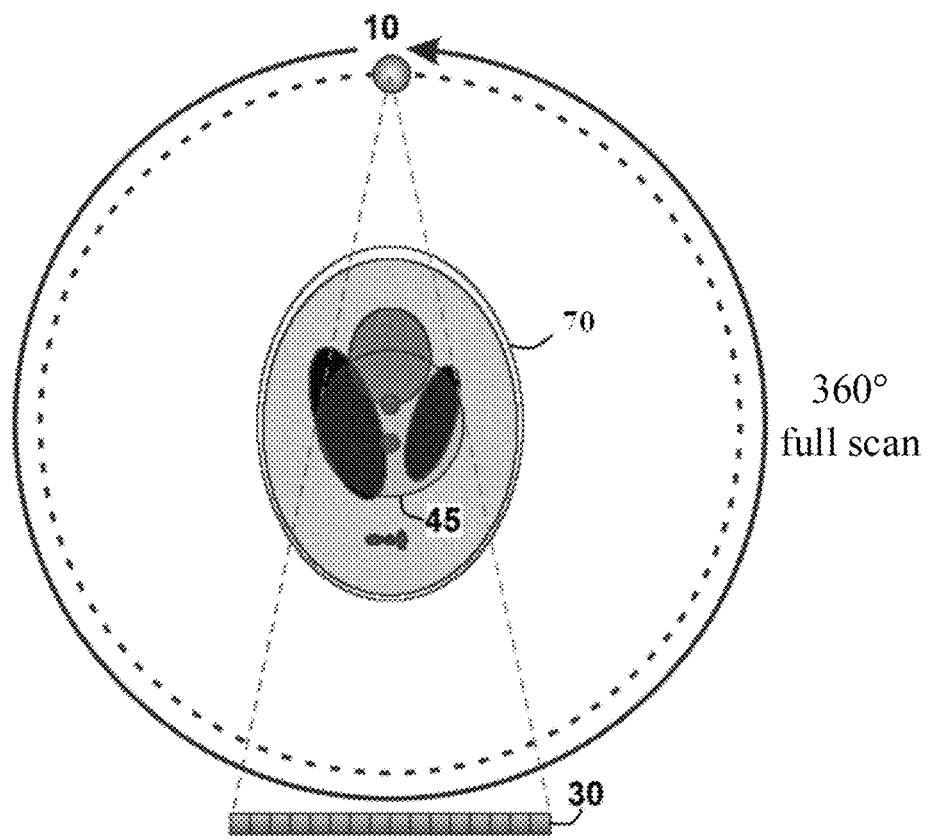
FIG. 2 shows a schematic diagram of a CT scanning apparatus for implementing a reconstruction scanning method according to some exemplary embodiments of the present disclosure.

FIG. 2 shows a schematic diagram of a CT scanning apparatus for implementing a reconstruction scanning method according to some exemplary embodiments of the present disclosure. As shown in FIG. 2, after an X-ray emitted from the X-ray source 10 is transmitted through at least one of the inspected object 70 in a field of view 4, the X-ray is received by the detecting and collecting apparatus 30, converted into an electrical signal and then converted into a digital signal representing an attenuation value. The digital signal, which serves as projection data, is reconstructed by a computer to obtain a high-quality image.

Figure 3:
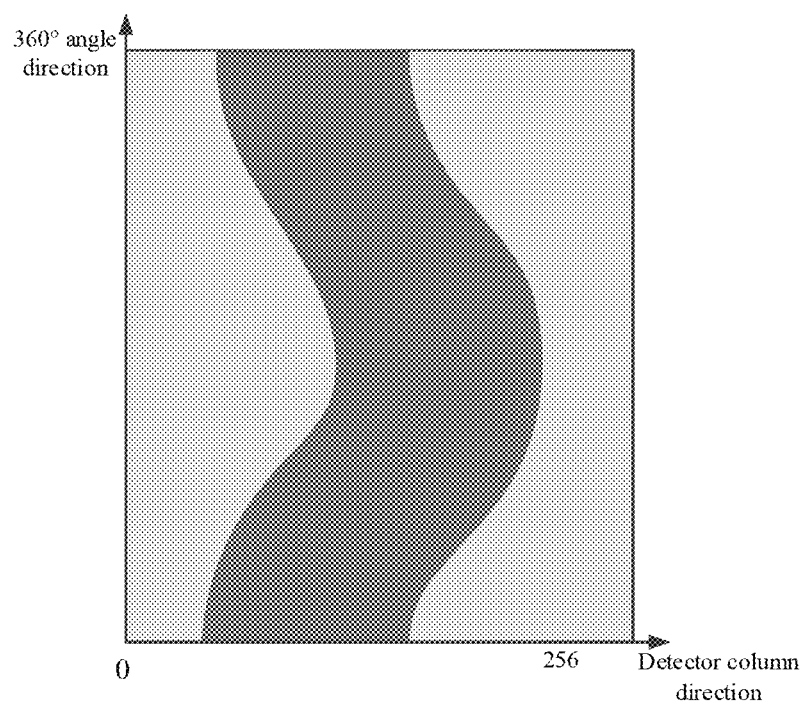
FIG. 3 shows an example of attenuation signal data obtained according to embodiments of the present disclosure.

According to embodiments of the present disclosure, the CT scanning is performed on the inspected object by using the above-mentioned CT scanning apparatus, so as to obtain an original attenuation signal. Attenuation signal data corresponding to a row of detectors may also be displayed in a form of two-dimensional images. FIG. 3 shows an example of attenuation signal data obtained according to embodiments of the present disclosure. As shown in FIG. 3, a horizontal axis direction of the original attenuation signal represents a sequence (e.g., from 1 to 256) of pixels in a detector column direction, and a vertical axis of the original attenuation signal represents an angle (e.g., from 1 to 360 degrees). The original attenuation signal becomes projection data after preprocessing. For example, the projection data may be obtained by performing pre-processing, such as a negative logarithmic transformation, etc., on the projection data by the CT scanning apparatus. Then, the data processor 60 reconstructs a program. For example, a reconstructed image may be obtained by using a mainstream analytical reconstruction method in the art. The reconstructed image is the radiation image mentioned in embodiments of the present disclosure.

In embodiments of the present disclosure, the data processor 60 may perform an image recognition (e.g., a target detection) on the above-mentioned reconstructed image (i.e., the radiation image) to identify the object of interest (e.g., contraband) in the radiation image. Specifically, the radiation image recognition system 80 may be deployed in the data processor 60, and the radiation image recognition model may be deployed in the radiation image recognition system 80. The radiation image recognition system 80 may recognize the radiation image using the radiation image recognition model.

Figure 4:
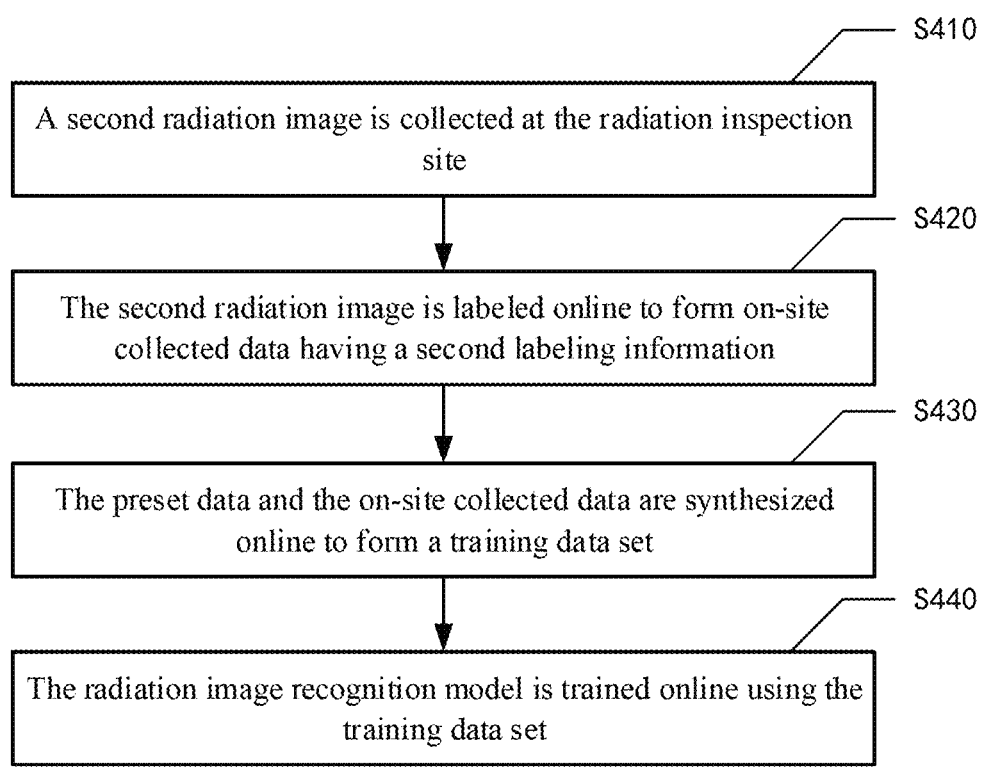
FIG. 4 shows a schematic flowchart of a method of training a radiation image recognition model online according to embodiments of the present disclosure.

FIG. 4 shows a schematic flowchart of a method of training a radiation image recognition model online according to an embodiment of the present disclosure. In embodiments of the present disclosure, the radiation image recognition model is applied to a radiation inspection system (e.g., the CT scanning apparatus shown in FIG. 1), the radiation inspection system is arranged at a radiation inspection site, preset data is pre-stored in the radiation inspection system, and the preset data includes a first radiation image. The method of training the radiation image recognition model online may include operations S410 to S440.

In embodiments of the present disclosure, the first radiation image in the preset data is configured such that: the first radiation image in the preset data has a first labeling information, and the first labeling information is used to indicate all objects of interest in the first radiation image; the first radiation image in the preset data does not include any object of interest; or the preset data includes a plurality of first radiation images, and at least one of the plurality of first radiation images has the first labeling information, the first labeling information is used to indicate all objects of interest in the first radiation images, and at least one of the plurality of first radiation images does not include any object of interest. That is to say, the first radiation image in the preset data has the first labeling information indicating all the objects of interest in the first radiation image, and/or the first radiation image in the preset data may not include any object of interest. At this time, the first radiation image provides only a background information.

In operation S410, a second radiation image is collected at the radiation inspection site.

In embodiments of the present disclosure, the radiation image recognition model is provided by the developer, and the preset data is pre-stored in the radiation inspection system. The preset data may be data in a security package pre-configured by the developer or on-site data confirmed by the user. Then, the radiation image recognition model is deployed in the radiation inspection system. In a practical application, the radiation inspection system deployed with the radiation image recognition model is arranged at the radiation inspection site for use of the user at the radiation inspection site. For example, the radiation inspection site may be a security inspection site such as an airport, a subway, etc., or an inspection site such as a port, a dock, a vehicle inspection station, etc. Embodiments of the present disclosure do not impose a special restriction on the radiation inspection site.

For example, in operation S410, a user using the radiation inspection system operates the radiation inspection system as shown in FIG. 1 to reconstruct collected projection data, so that the radiation image may be obtained. In this way, the second radiation image may be collected at the radiation inspection site.

In embodiments of the present disclosure, the preset data is data provided by the developer and collected off-site; the second radiation image is collected on site.

For example, a reserved security package may cover data collected at different sites in an early stage and specific data made in a laboratory as much as possible.

In embodiments of the present disclosure, the preset data includes a typical sample in the radiation inspection, and the typical sample is screened by a genetic method. Specifically, the typical sample is screened by the genetic method including, but is not limited to that: the number of typical samples is set as Q, and for a complete training dataset, we randomly select Q samples for a total of q times, so that q independent models may be trained respectively. Then, according to a quantitative index performance (an accuracy, a false alarm rate, etc.) of a model on test data, we screen out q/2 models with a better performance, randomly disarrange corresponding q/2 groups of data, resample q groups of data (each group has still Q samples), and then perform a model training, a screening and a data resampling. The process is repeated until an index of a trained optimal model is no longer significantly improved or Q typical samples have been screened.

In embodiments of the present disclosure, typical samples of each category are preset in a system. After adding data of a new category or false alarm data of an original category, all data is combined to train the model, so as to realize a function of continuous learning. That is, a new detection category may be automatically added or a detection performance of an existing category may be improved without reducing a detection effect of other categories.

In operation S420, the second radiation image is labeled online to form on-site collected data having a second labeling information, wherein the second labeling information is an incomplete labeling information of the second radiation image, and the second labeling information is used to indicate at least one of objects of interest in the second radiation image.

It should be noted that an expression "online" used herein refers to an operation performed at the radiation inspection site relative to "non-online" or "offline" operation required for data returning, etc. For example, "online labeling" refers to a labeling performed at the radiation inspection site, that is, a labeling performed at the radiation inspection site without returning data to the developer; similarly, "online synthesis" refers to a synthesis performed at the radiation inspection site, that is, a synthesis performed at the radiation inspection site without returning the data to the developer; "online training" refers to a training performed at the radiation inspection site, that is, a training performed at the radiation inspection site without returning the data to the developer.

It should also be noted that an expression "incomplete labeling information" used herein means that the labeling information indicates only at least one of objects of interest in a labeled image, but not all objects of interest in the labeled image. In contrast, an expression "complete labeling information" means that the labeling information indicates all objects of interest in the labeled image. For example, taking categories of objects of interest in the radiation image as an example, objects of interest of k categories may exist in the radiation image, where k is a positive integer greater than or equal to 1, for example, k may be equal to 5, 8, 10, etc. For example, the k categories may correspond to categories of contraband specified at each radiation inspection site. If the labeling information fully reflects all objects of interest of k categories in the radiation image during labeling, the labeling information may be considered as the complete labeling information. That is to say, expressions such as "complete labeling", "complete labeling information", etc. may indicate that all objects of all categories in the image are labeled. If the labeling information does not fully reflect the objects of interest of k categories in the radiation image during labeling, for example, the labeling information reflects only objects of interest of p categories in the radiation image (p<k), for example, p may even be equal to 1, or the labeling information does not reflect all objects of a certain category in the radiation image, the labeling information may be considered as the incomplete labeling information. That is to say, expressions such as "incomplete labeling", "incomplete labeling information", etc. may indicate that all categories in the image or all objects of one or some categories in the image are not labeled. In some examples, the expressions "incomplete labeling", "incomplete labeling information", etc. used herein include that only an object of a certain category in the image is labeled, that is, an extremely incomplete situation may be included.

In the operation S420, the second radiation image may be labeled online to form on-site collected data without returning the second radiation image.

In embodiments of the present disclosure, the preset data is data with the complete labeling information, and the on-site collected data formed in operation S420 is data with the incomplete labeling information. For example, in the preset data, the first labeling information indicates all objects of interest of all categories in the first radiation image. In the on-site collected data formed in operation S420, the second labeling information indicates objects of interest of at least one of categories in the second radiation image, or the second labeling information is used to indicate at least one of objects of interest of at least one of categories in the second radiation image.

For example, all the objects of interest in the first radiation image include u1 categories, where u1 is a positive integer greater than or equal to 1. In a category ui of the u1 categories, the number of objects of interest of the category is vui. Specifically, in the first radiation image, the number of objects of interest of a $1^{st}$ category is v1, the number of objects of interest of a $2^{nd}$ category is v2, and so on, the number of objects of interest of a $u1^{th}$ category is vu1. The first labeling information indicates all the objects of interest of all categories in the first radiation image. That is, the first labeling information indicates the objects of interest of all the u1 categories, and the first labeling information indicates all objects of interest of each category. Specifically, the first labeling information indicates: v1 objects of interest of the $1^{st}$ category, v2 objects of interest of the $2^{nd}$ category, and so on, and vu1 objects of interest of the $u1^{st}$ category.

For example, all objects of interest in the second radiation image include u2 categories. In a category ui of the u2 categories, the number of objects of interest of the category is wi. Specifically, in the second radiation image, the number of objects of interest of a $1^{st}$ category is w1, the number of objects of interest of a $2^{nd}$ category is w2, and so on, the number of objects of interest of a $u2^{th}$ is wu2. The second labeling information is used to indicate objects of interest of at least one of categories in the second radiation image, or the second labeling information is used to indicate at least one of objects of interest of at least one of categories in the second radiation image. That is, the second labeling information indicates the objects of interest of at least one of all the u2 categories. For example, the second labeling information is used to indicate objects of interest of u3 categories in the second radiation image, where u2 is a positive integer greater than or equal to 2, u3 is a positive integer and 1≤u3<u2. For another example, the second labeling information may be used to indicate at least one of the objects of interest of the $ui^{th}$ category in the second radiation image. For example, when the second labeling information is used to indicate the objects of interest of the $ui^{th}$ category in the second radiation image, the number of the objects of interest of the $ui^{th}$ category in the second radiation image is wui. However, the second labeling information may indicate 1 to wui objects of interest in the wui objects of interest. For example, the second labeling information may only indicate 1 object of interest in the wui objects of interest, or the second labeling information may indicate wui objects of interest in the wui objects of interest.

In embodiments of the present disclosure, the labeling the second radiation image online may include: automatically detecting an object of interest of an unknown category in the second radiation image; and sending a reminder signal, wherein the reminder signal is used to remind to label the object of interest of the unknown category in the second radiation image. In this way, a potential unknown object may be automatically recognized. In most cases, the user do not need to manually mark a location of the object, but only give a corresponding tag, which may improve a user friendliness of the system.

For example, in an online labeling stage, a bounding box that does not overlap with a tag but has a high score may be purposely retained, and a tag of the bounding box is marked as an unknown category to participate in a subsequent classification process of the model, so that the bounding box may be avoid to be defined as a background and thus suppressed.

Figure 5:
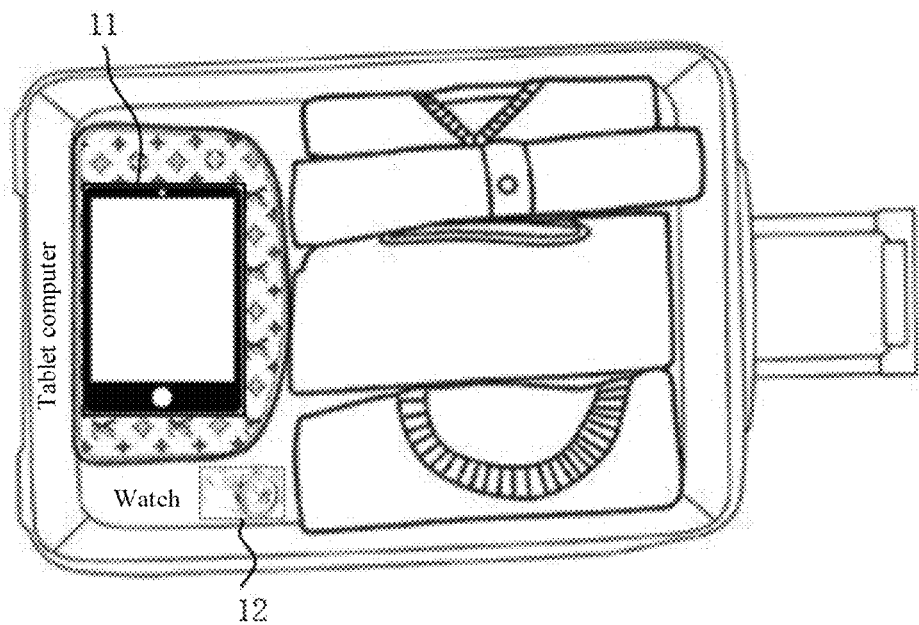
FIG. 5 shows a schematic diagram of a radiation image in preset data according to some exemplary embodiments of the present disclosure.

For example, the first labeling information includes at least one first labeling box labeled in the first radiation image and at least one first tag labeled in the first radiation image, the at least one first labeling box is used to indicate locations of all the objects of interest in the first radiation image, and the at least one first tag is used to indicate categories of all the objects of interest in the first radiation image. FIG. 5 shows a schematic diagram of a radiation image in preset data according to some exemplary embodiments of the present disclosure. Referring to FIG. 5, the first radiation image includes objects of interest of two categories, that is, a tablet computer and a watch. The first labeling information includes a first labeling box 11 for labeling the tablet computer and a first tag "tablet computer", and a first labeling box 12 for labeling the watch and a first tag "watch".

Figure 6A:
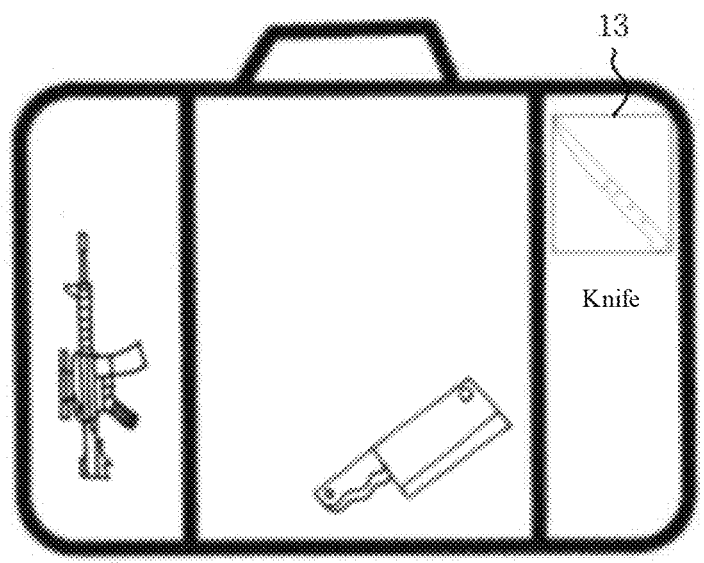
FIG. 6A shows a schematic diagram of a radiation image in on-site collected data according to some exemplary embodiments of the present disclosure.

For example, the second labeling information includes at least one second labeling box labeled in the second radiation image and at least one second tag labeled in the second radiation image, the at least one second labeling box is used to indicate a location of at least one of the objects of interest in the second radiation image, and the at least one second tag is used to indicate a category of at least one of the objects of interest in the second radiation image. FIG. 6A shows a schematic diagram of a radiation image in on-site collected data according to some exemplary embodiments of the present disclosure. Referring to FIG. 6A, the second radiation image includes objects of interest of three categories, that is, a gun, a first knife (e.g., a kitchen knife) and a second knife (e.g., a dagger). The second marking information includes a second labeling box 13 for labeling the second knife (e.g., the dagger) and a second tag "knife". That is, the second labeling information labels only an object of interest of a category in the second radiation image, which is an incomplete labeling information.

Figure 6B:
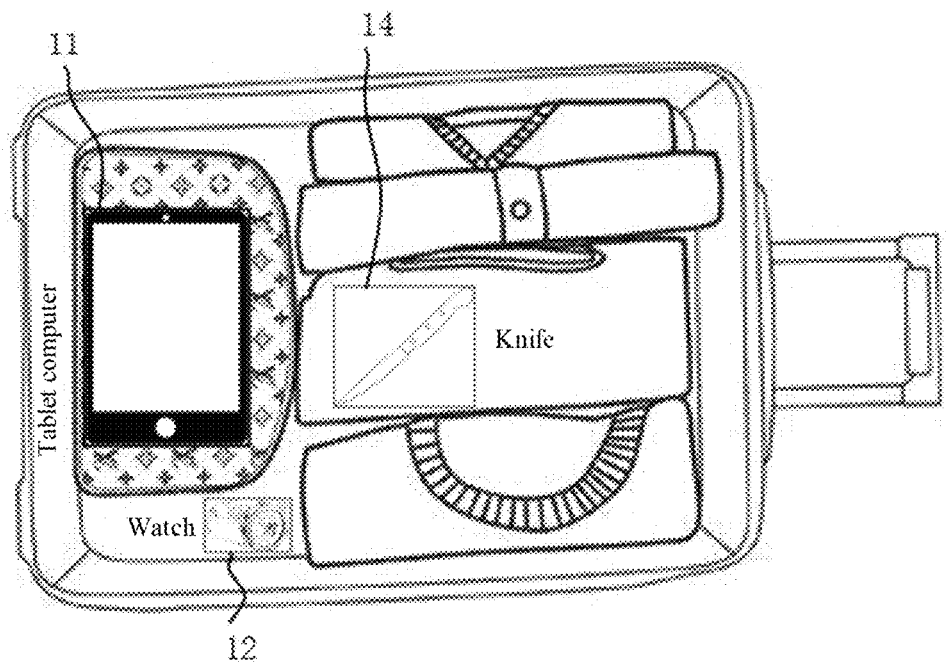
FIG. 6B shows a schematic diagram of a radiation image in synthesized data according to some exemplary embodiments of the present disclosure.

It should be noted that categories and labeling boxes of the objects of interest shown in FIG. 5, FIG. 6A and FIG. 6B are only schematic illustrations for the purpose of describing embodiments of the present disclosure, and should not be construed as limiting embodiments of the present disclosure. In other embodiments, the image may include objects of interest of other categories and corresponding labeling boxes.

In operation S430, the preset data and the on-site collected data are synthesized online to form a training data set.

In operation S440, the radiation image recognition model is trained online using the training data set.

Figure 7:
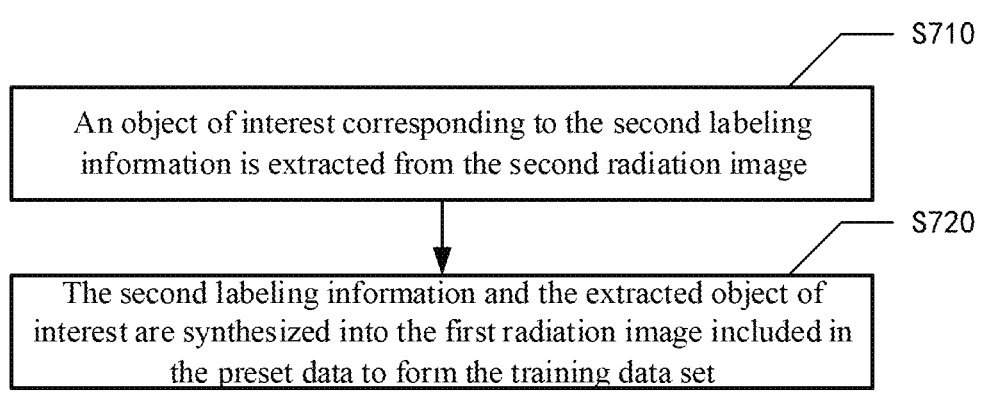
FIG. 7 shows a schematic flowchart of an online synthesis step in a method of training a radiation image recognition model online according to some exemplary embodiments of the present disclosure.

FIG. 7 shows a schematic flowchart of an online synthesis step in a method of training a radiation image recognition model online according to some exemplary embodiments of the present disclosure. Referring to FIG. 7, the operation S430 may include operations S710 to S720.

In operation S710, an object of interest corresponding to the second labeling information is extracted from the second radiation image.

In operation S720, the second labeling information and the extracted object of interest are synthesized into the first radiation image included in the preset data to form the training data set.

In embodiments of the present disclosure, incomplete labeling data collected on site may be directly used to eliminate a negative impact of the incomplete labeling data, which may greatly reduce a labeling burden of the user. Specifically, data with incomplete or extremely incomplete labeling may be used, that is, each category in a data set does not need to be completely labeled, or only at least one of objects of a category of interest in an image may be labeled to minimize the labeling burden and improve a robustness of the system. In addition, the data collected on site may be ensured to not go out of the site, that is, the data collected on site is not required to be returned, so that confidentiality requirements of the user may be met.

In embodiments of the present disclosure, when interacting with the user, the user does not need to provide a complete labeling information of a category of the object of interest, that is, the user may even label an example of the category of interest in a certain image sample. The interaction requirement may greatly reduce the burden of the user and enhance the robustness of the system.

Figure 8:
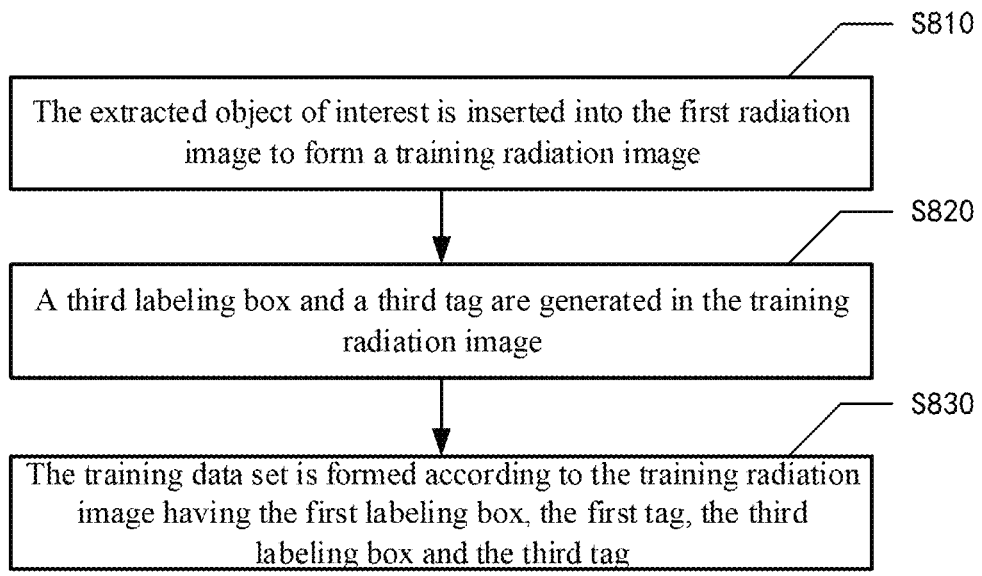
FIG. 8 shows a detailed flowchart of an online synthesis step in a method of training a radiation image recognition model online according to some exemplary embodiments of the present disclosure.

FIG. 8 shows a detailed flowchart of an online synthesis step in a method of training a radiation image recognition model online according to some exemplary embodiments of the present disclosure. FIG. 6B shows a schematic diagram of a radiation image in synthesized data according to some exemplary embodiments of the present disclosure. With reference to FIG. 6B and FIG. 8, the operation S720 may include operations S810 to S830.

In operation S810, the extracted object of interest is inserted into the first radiation image to form a training radiation image. For example, with reference to FIG. 6B, the knife labeled in FIG. 6A is inserted into the first radiation image shown in FIG. 5 to form the training radiation image shown in FIG. 6B.

For example, referring to FIG. 5, the first radiation image includes a transparent region and an opaque region.

The operation S810 may specifically include: selecting a region meeting an insertion requirement from the transparent region of the first radiation image as at least one candidate insertion region; selecting one of the at least one candidate insertion region as an insertion region according to a data synthesis rule; and inserting the extracted object of interest into the insertion region.

For example, the meeting an insertion requirement includes that: an area or a volume of the candidate insertion region is greater than or equal to an area or a volume of a to-be-inserted object of interest.

For example, the data synthesis rule includes that: in the first radiation image, a concealment degree of a surrounding object to the candidate insertion region meets a specified requirement.

In the embodiments, for a data insertion operation, the transparent region and the opaque region of the radiation image in the preset data are divided according to a reconstruction value (i.e., an attenuation coefficient) and a transparency threshold, and in the transparent region, a portion whose area (for a two-dimensional image) or volume (for a three-dimensional image) meets requirements is selected as the candidate insertion region. At the same time, a concealment degree of the insertion region is quantified according to a distance from the location to a view plane and the number of surrounding objects, and finally an insertion region meeting a specified concealment degree is determined. In embodiments of the present disclosure, the data insertion operation may ensure a rationality and an authenticity of synthesized data from the physical meaning of data. Quantifying a concealment of the insertion region may generate data with different difficulties (i.e., an occlusion degree), so as to ensure a richness of the synthesized data.

In operation S820, a third labeling box and a third tag are generated in the training radiation image, wherein the third labeling box is generated according to the second labeling box, and the third tag is identical to a second tag and used to indicate a category of an object of interest surrounded by the third labeling box.

In operation S830, the training data set is formed according to the training radiation image having the first labeling box, the first tag, the third labeling box and the third tag.

Referring to FIG. 6B, the training radiation image includes objects of interest of three categories, that is, a tablet computer, a watch and a knife. The tablet computer and the watch are objects of interest contained in the first radiation image, and the knife is an object of interest extracted and inserted from the second radiation image. With reference to FIG. 6A and FIG. 6B, a tag of the object of interest "knife" remains unchanged and is still "knife". A location of a third labeling box 14 of the object of interest "knife" is different from a location of the second labeling box 13 of the "knife" in FIG. 6A. In FIG. 6B, the location of the third labeling box 14 of the object of interest "knife" is determined according to the insertion region.

In an existing radiation image intelligent recognition method, the data with the complete labeling information needs to be used as training data to train a model, which may undoubtedly greatly increase a workload of labeling; if the data with the incomplete labeling information is used as the training data, an unlabeled object of interest in the training data may be incorrectly recognized as a background of the radiation image during a training process, resulting in a low accuracy of the trained model. In embodiments of the present disclosure, the incomplete labeling information may be directly used, that is, only information with a labeled region in the data is used, the second radiation image with the incomplete labeling information is segmented, at least one of labeled objects of interest are extracted and inserted into the preset data, and thus training data containing objects of the category of interest is synthesized. In this way, a problem that an incomplete labeling reduces a performance of the model may be solved without completely labeling the objects of interest in the second radiation image.

In embodiments of the present disclosure, the inserting the extracted object of interest into the first radiation image to form a training radiation image may specifically include: performing a data augmentation operation on the extracted object of interest to form augmentation data, wherein a number of extracted objects of interest is n, and a number of objects of interest included in the augmentation data is N, N=m*n, where n is a positive integer greater than or equal to 1, and m is a positive integer greater than or equal to 2; and inserting the N objects of interest included in the augmentation data into the first radiation image respectively, so as to form a plurality of training radiation images.

For example, the data augmentation operation includes at least one selected from: a flip operation, a rotation operation, and a numerical dithering operation.

That is to say, in embodiments of the present disclosure, the objects of interest extracted by segmentation may be inserted into the preset data in different postures. In the strategy, a large number of data may be generated for online training the model by providing only a small number of labels.

Figure 9:
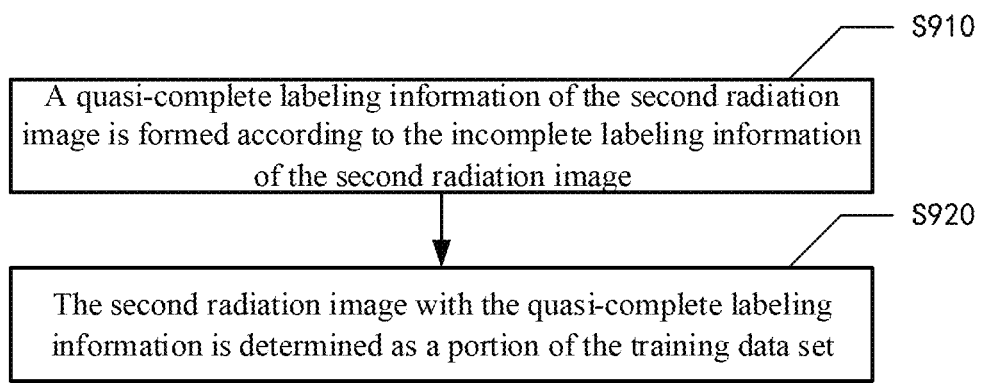
FIG. 9 shows a schematic flowchart of a method of training a radiation image recognition model online according to other exemplary embodiments of the present disclosure.

FIG. 9 shows a schematic flowchart of a method of training a radiation image recognition model online according to other exemplary embodiments of the present disclosure. Referring to FIG. 9, the method may further include operations S910 to S920.

In operation S910, a quasi-complete labeling information of the second radiation image is formed according to the incomplete labeling information of the second radiation image.

It should be noted that an expression "quasi-complete labeling information" used herein refers to a complete labeling information generated by the incomplete labeling information after an algorithm processing. Similar to the complete labeling information, the quasi-complete labeling information indicates all the objects of interest in the labeled image. The complete labeling information is directly labeled, and the quasi-complete labeling information is generated by converting the incomplete labeling information.

In operation S920, the second radiation image having the quasi-complete labeling information is determined as a portion of the training data set.

Figure 10:
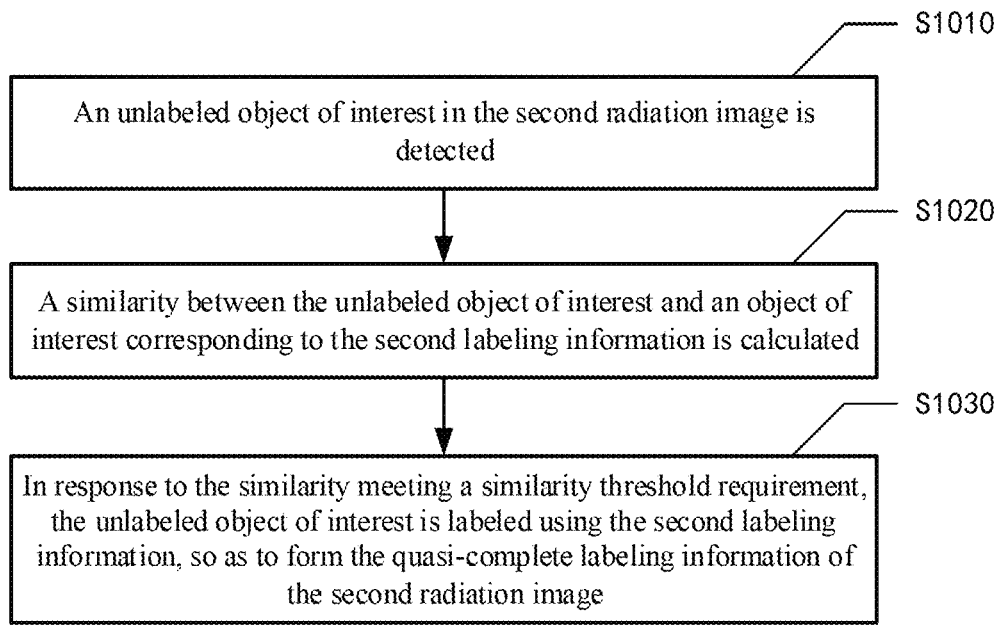
FIG. 10 shows a detailed flowchart of operation S910 in FIG. 9.

FIG. 10 shows a detailed flowchart of operation S910 in FIG. 9. Referring to FIG. 10, the operation S910 may further include operations S1010 to S1030.

In operation S1010, an unlabeled object of interest in the second radiation image is detected.

In operation S1020, a similarity between the unlabeled object of interest and an object of interest corresponding to the second labeling information is calculated.

In operation S1030, in response to the similarity meeting a similarity threshold requirement, the unlabeled object of interest is labeled using the second labeling information, so as to form the quasi-complete labeling information of the second radiation image.

In embodiments of the present disclosure, a similarity between an unknown object detected by an algorithm in the on-site data and objects of a new category labeled by the user is calculated. A similarity measurement may be selected but not limited to a Euclidean distance in a feature space. When the distance is less than a certain threshold, it may be determined that the unknown object belongs to the new category, and thus a quasi-complete labeling information of the new category may be generated for a subsequent training.

Figure 11:
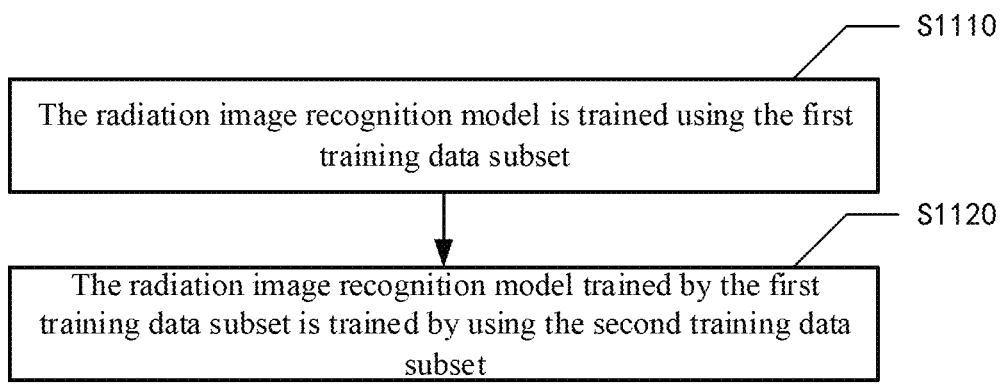
FIG. 11 shows a schematic flowchart of a method of training a radiation image recognition model online according to other exemplary embodiments of the present disclosure.

FIG. 11 shows a schematic flowchart of a method of training a radiation image recognition model online according to other exemplary embodiments of the present disclosure. Referring to FIG. 11, the method may further include operations S1110 to S1120. The training data set includes a first training data subset and a second training data subset, the first training data subset and the second training data subset have different data distributions, the first training data subset includes the preset data, and the second training data subset includes an unlabeled third radiation image collected at the radiation inspection site.

In operation S1110, the radiation image recognition model is trained using the first training data subset.

In operation S1120, the radiation image recognition model trained by the first training data subset is trained by using the second training data subset, wherein in a process of training the radiation image recognition model trained by the first training data subset by using the second training data subset, a distance between the first training data subset and the second training data subset is minimized by adjusting a parameter of a feature layer of the radiation image recognition model.

Due to the different distributions of the data collected at different sites, in order to optimize a performance, a domain migration function may be realized in the method provided by embodiments of the present disclosure, so that the trained model may achieve a best effect at different sites. Specifically, an unsupervised domain adaptation method may be used. The training set includes at least one of original data with a tag and at least one of on-site actual data without a tag. The original data with the tag is responsible for training a detection performance of the model, and the on-site actual data without the tag is responsible for training the model to treat the two parts of data (the original data and the on-site actual data) without distinction. A gap between different on-site data may be reduced by minimizing a distance between the two parts of data in a feature layer, and the model trained with the original data may achieve a best detection effect at different sites.

In the unsupervised domain adaptation method, a source task is the same as a target task, but a source domain has a different data distribution from that of a target domain. The source domain has a large number of marked samples, while the target domain has no (or very few) marked sample. Knowledge learned from the large number of marked samples in the source domain needs to be transferred to the target domain so as to achieve a same task.

For example, in embodiments of the present disclosure, a feature-based adaption method may be used. Specifically, samples in the source domain sample and samples in the target domain may be adjusted to a same feature space with a mapping function, and the samples may be aligned with each other in the feature space.

In embodiments of the present disclosure, an instance adaptive method may also be used. Specifically, in the instance adaptation method, considering that there are always some samples in the source domain that are similar to the samples in the target domain, a loss function of all samples in the source domain is multiplied by a weight (i.e., a degree of "emphasis") during training. The more similar the samples are to the samples in the target domain, the greater the weight is. The model may work better in the target domain through a parameter migration.

For example, a distance between data in the source domain and data in the target domain may be measured by following algorithms: a KL divergence, an H-divergence, and a Wasserstein distance, etc.

Figure 12:
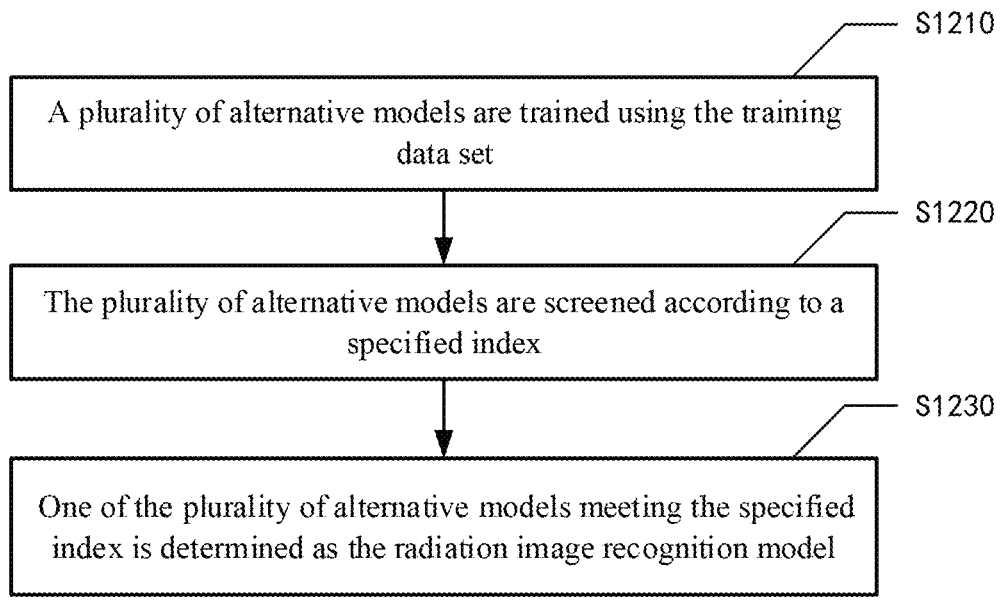
FIG. 12 shows a schematic flowchart of an online training step in a method of training a radiation image recognition model online according to some exemplary embodiments of the present disclosure.

FIG. 12 shows a schematic flowchart of an online training step in a method of training a radiation image recognition model online according to some exemplary embodiments of the present disclosure. Referring to FIG. 12, the method may further include operations S1210 to S1230.

In operation S1210, a plurality of alternative models are trained using the training data set.

In operation S1220, the plurality of alternative models are screened according to a specified index.

In operation S1230, one of the plurality of alternative models meeting the specified index is determined as the radiation image recognition model.

For example, the plurality of alternative models may be selected from various known deep-learning-based models, including but not limited to an RCNN series model, and an SSD and YOLO series model. The specified index may include a known model screening index such as model inference time, an accuracy rate, a recall rate, a video memory occupation, etc.

Embodiments of the present disclosure further provide a method of recognizing a radiation image. The method of recognizing the radiation image is applied to a radiation inspection system, and the radiation inspection system is arranged at a radiation inspection site. It should be noted that the method of recognizing the radiation image described below corresponds to the method of training the radiation image recognition model described above. For the sake of simplicity, some exemplary descriptions will be omitted for following descriptions of the method of recognizing the radiation image. For the omitted parts, the corresponding at least one of the method of training the radiation image recognition model described above may be referred to without a conflict.

Figure 13:
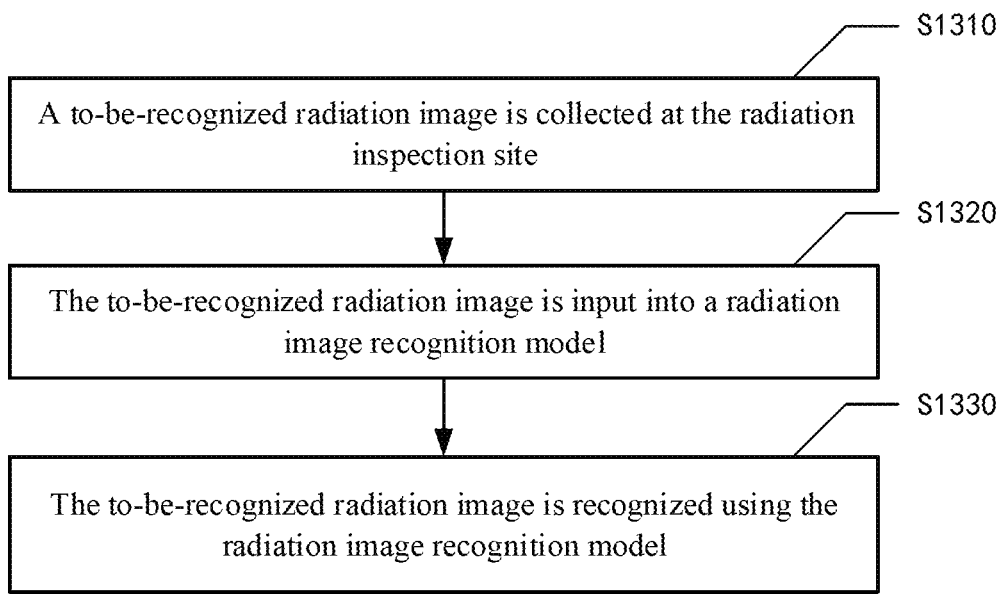
FIG. 13 shows a schematic flowchart of a method of recognizing a radiation image according to exemplary embodiments of the present disclosure.

FIG. 13 shows a schematic flowchart of a method of recognizing a radiation image according to an exemplary embodiment of the present disclosure.

As shown in FIG. 13, the method of recognizing the radiation image according to the exemplary embodiment of the present disclosure may include operations S1310 to S1330. The method of recognizing the radiation image may be performed by a processor or any electronic device including a processor. For example, the method of recognizing the radiation image may be performed by the radiation inspection apparatus described above.

In operation S1310, a to-be-recognized radiation image is collected at the radiation inspection site.

In operation S1320, the to-be-recognized radiation image is input into a radiation image recognition model, wherein the radiation image recognition model is trained by the method described above.

In operation S1330, the to-be-recognized radiation image is recognized using the radiation image recognition model.

Based on the above-mentioned method of training the radiation image recognition model, the present disclosure further provides an apparatus of training a radiation image recognition model. The apparatus will be described below in detail with reference to FIG. 16.

Figure 14:
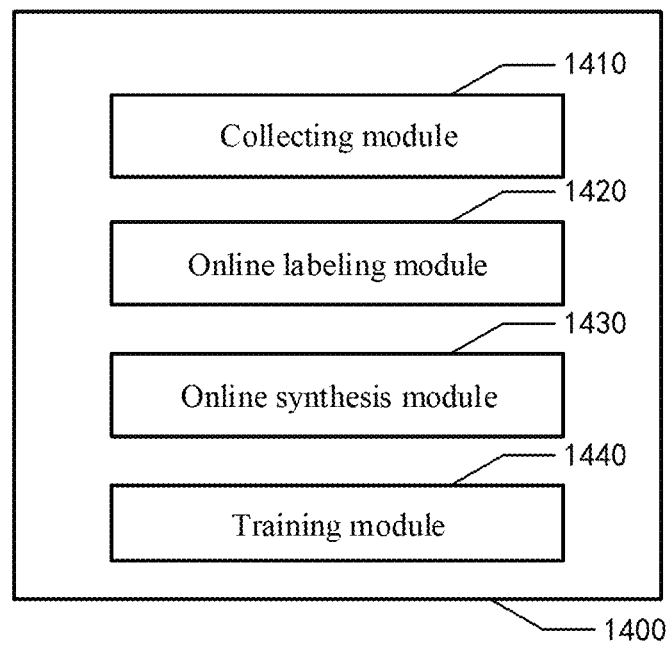
FIG. 14 shows a structural block diagram of an apparatus of training a radiation image recognition model online according to exemplary embodiments of the present disclosure.

FIG. 14 shows a structural block diagram of an apparatus of training a radiation image recognition model online according to an exemplary embodiment of the present disclosure. Referring to FIG. 14, an apparatus 1400 includes a collecting module 1410, an online labeling module 1420, an online synthesis module 1430, and a training module 1440.

The collecting module 1410 is used to collect a second radiation image at the radiation inspection site. In some exemplary embodiments, the collecting module 1410 may be used to perform the above-mentioned operation S410 and a sub-operation of the operation S410, which will not be repeated here.

The online labeling module 1420 is used to label the second radiation image online to form on-site collected data having a second labeling information, wherein the second labeling information is an incomplete labeling information of the second radiation image, and the second labeling information is used to indicate at least one of objects of interest in the second radiation image. In some exemplary embodiments, the online labeling module 1420 may be used to perform the above-mentioned operation S420 and a sub-operation of the operation S420, which will not be repeated here.

The online synthesis module 1430 is used to synthesize the preset data and the on-site collected data online to form a training data set. In some exemplary embodiments, the online synthesis module 1430 may be used to perform the above-mentioned operation S430 and a sub-operation of the operation S430, which will not be repeated here.

The training module 1440 is used to train the radiation image recognition model online using the training data set. In some exemplary embodiments, the training module 1440 may be used to perform the above-mentioned operation S440 and a sub-operation of the operation S440, which will not be repeated here.

In embodiments of the present disclosure, the synthesizing the preset data and the on-site collected data online to form a training data set includes: extracting an object of interest corresponding to the second labeling information from the second radiation image; and synthesizing the second labeling information and the extracted object of interest into the first radiation image included in the preset data to form the training data set.

Figure 15:
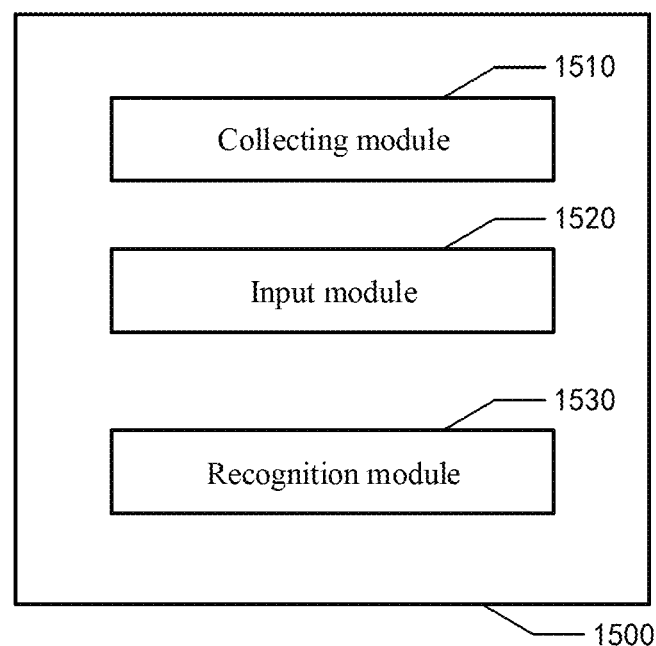
FIG. 15 shows a structural block diagram of an apparatus of recognizing a radiation image according to exemplary embodiments of the present disclosure.

FIG. 15 shows a structural block diagram of an apparatus of recognizing a radiation image according to an exemplary embodiment of the present disclosure. As shown in FIG. 15, an apparatus 1500 of recognizing a radiation image includes a collecting module 1510, an input module 1520, and a recognition module 1530.

The collecting module 1510 is used to collect a to-be-recognized radiation image at the radiation inspection site. In some exemplary embodiments, the collecting module 1510 may be used to perform the above-mentioned operation S1310 and a sub-operation of the operation S1310, which will not be repeated here.

The input module 1520 is used to input the to-be-recognized radiation image into a radiation image recognition model, wherein the radiation image recognition model is trained according to the method described above. In some exemplary embodiments, the input module 1520 may be used to perform the above-mentioned operation S1320 and a sub-operation of the operation S1320, which will not be repeated here.

The recognition module 1530 is used to recognize the to-be-recognized radiation image using the radiation image recognition model. In some exemplary embodiments, the recognition module 1530 may be used to perform the above-mentioned operation S1330 and a sub-operation of the operation S1330, which will not be repeated here.

According to embodiments of the present disclosure, any number of modules in the collecting module 1410, the online labeling module 1420, the online synthesis module 1430 and the training module 1440 included in the apparatus 1400 and the collecting module 1510, the input module 1520 and the recognition module 1530 included in the apparatus 1500 of recognizing the radiation image may be combined in a module, or any one of the modules may be divided into a plurality of modules. Alternatively, at least some functions of one or more of the modules may be combined with at least some functions of other modules, and may be implemented in a module. According to embodiments of the present disclosure, at least one of the collecting module 1410, the online labeling module 1420, the online synthesis module 1430 and the training module 1440 included in the apparatus 1400 and the collecting module 1510, input module 1520 and recognition module 1530 included in the apparatus 1500 of recognizing the radiation image may be at least partially implemented as a hardware circuit, such as a field programmable gate array (FPGA), a programmable logic array (PLA), a system on chip, a system on substrate, a system on package, and an application specific integrated circuit (ASIC), or may be implemented by a hardware or firmware such as any other reasonable method of integrating or packaging the circuit, or may be implemented by any one or any combinations of the three implementation methods of software, hardware and firmware. Alternatively, at least one of the collecting module 1410, the online labeling module 1420, the online synthesis module 1430 and the training module 1440 included in the apparatus 1400 and the collecting module 1510, the input module 1520 and the recognition module 1530 included in the apparatus 1500 of recognizing the radiation image may be at least partially implemented as a computer program module. The computer program module, when run, may perform corresponding functions.

Figure 16:
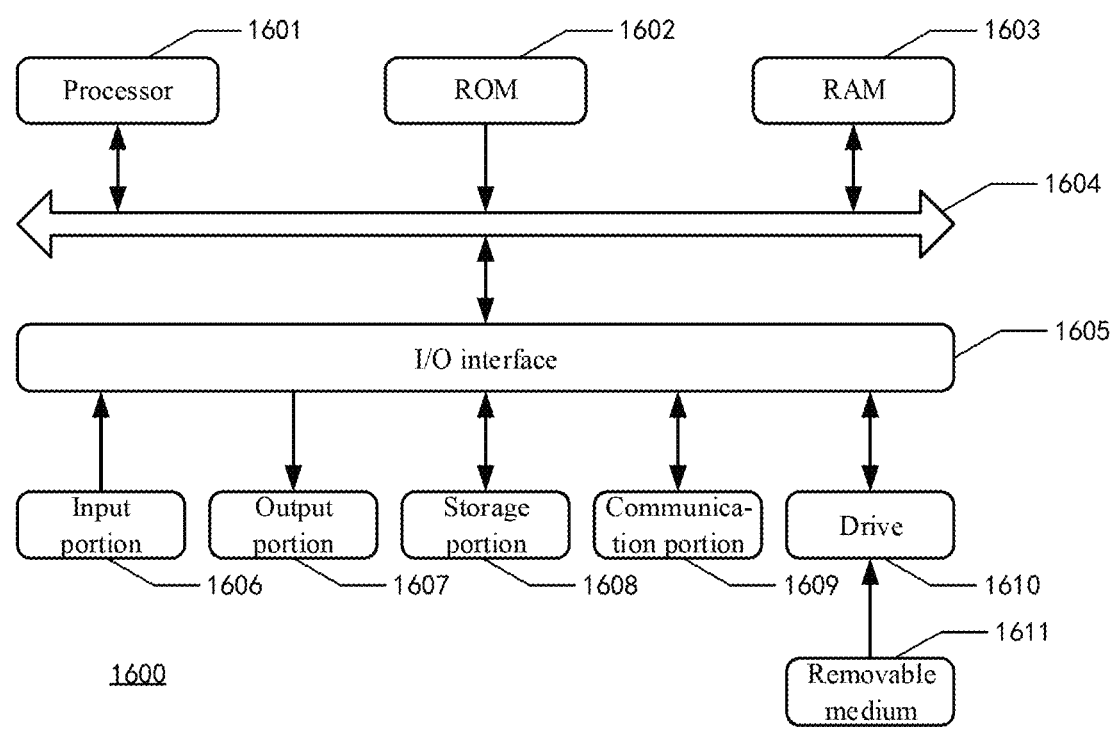
FIG. 16 schematically shows a structural block diagram of an electronic device suitable for implementing a method of training a radiation image recognition model online or a method of recognizing a radiation image according to an exemplary embodiment of the present disclosure.

FIG. 16 schematically shows a structural block diagram of an electronic device suitable for implementing a method of training a radiation image recognition model online or a method of recognizing a radiation image according to an exemplary embodiment of the present disclosure.

As shown in FIG. 16, an electronic device 1600 according to embodiments of the present disclosure includes a processor 1601, which may perform various appropriate actions and processes according to a program stored in a read-only memory (ROM) 1602 or a program loaded into a random access memory (RAM) 1603 from a storage portion 1608. The processor 1601 may include, for example, a general-purpose microprocessor (e.g., a CPU), an instruction set processor and/or a related chipset and/or a dedicated-purpose microprocessor (e.g., an application specific integrated circuit (ASIC)), etc. The processor 1601 may further include an on-board memory for caching purposes. The processor 1601 may include a single processing unit or a plurality of processing units for performing different actions of the method flow according to embodiments of the present disclosure.

For example, the electronic device may be a passive terahertz imaging apparatus.

The RAM 1603 stores various programs and data required for an operation of electronic device 1600. The processor 1601, the ROM 1602 and the RAM 1603 are connected to each other through a bus 1604. The processor 1601 performs various operations of the method flow according to embodiments of the present disclosure by executing a program in the ROM 1602 and/or the RAM 1603. It should be noted that the program may also be stored in one or more memories other than the ROM 1602 and the RAM 1603. The processor 1601 may also perform various operations of the method flow according to embodiments of the present disclosure by executing programs stored in the one or more memories.

According to embodiments of the present disclosure, the electronic device 1600 may further include an input/output (I/O) interface 1605, and the input/output (I/O) interface 1605 is also connected to the bus 1604. The electronic device 1600 may further include one or more of following components connected to the I/O interface 1605, including: an input portion 1606 including a keyboard, a mouse, etc.; an output portion 1607 including a cathode ray tube (CRT), a liquid crystal display (LCD), etc., and a speaker, etc.; a storage portion 1608 including a hard disk, etc.; and a communication portion 1609 including a network interface card such as a LAN card, a modem, etc. The communication portion 1609 performs a communication processing via a network such as the Internet. A drive 1610 is also connected to the I/O interface 1605 as required. A removable medium 1611, such as a magnetic disk, an optical disk, a magneto-optical disk, a semiconductor memory, or the like, is installed on the drive 1610 as required, so that a computer program read therefrom may be installed into the storage portion 1608 as required.

The present disclosure further provides a computer-readable storage medium. The computer-readable storage medium may be included in the device/apparatus/system described in the above-mentioned embodiments; the computer-readable storage medium may also exist alone without being assembled into the device/apparatus/system. The above-mentioned computer-readable storage medium carries one or more programs. The above-mentioned one or more programs, when executed, may implement the method according to embodiments of the present disclosure.

According to embodiments of the present disclosure, the computer-readable storage medium may be a non-volatile computer-readable storage medium. For example, the non-volatile computer-readable storage medium includes, but is not limited to: a portable computer disk, a hard disk, a random access memory (RAM), a read-only memory (ROM), an erasable programmable read-only memory (EPROM or a flash memory), a portable compact disk read-only memory (CD-ROM), an optical storage element, a magnetic storage element, or any suitable combination thereof. In the present disclosure, the computer-readable storage medium may be any tangible medium containing or storing a program, and the program may be used by or in combination with an instruction execution system, apparatus or element. For example, according to embodiments of the present disclosure, the computer-readable storage medium may include one or more memories other than the ROM 1602 and/or the RAM 1603 and/or the ROM 1602 and the RAM 1603 described above.

Embodiments of the present disclosure further include a computer program product, which includes a computer program. The computer program includes a program code for performing the method shown in the flowchart. When the computer program product runs in a computer system, the program code is used to cause the computer system to implement the method provided by embodiments of the present disclosure.

The above-mentioned functions defined in the system/apparatus of embodiments of the present disclosure are performed when the computer program is executed by the processor 1601. According to embodiments of the present disclosure, the system, the apparatuses, the modules, the units, etc. described above may be implemented by the computer program module.

In an embodiment, the computer program may rely on a tangible storage medium such as an optical storage element, a magnetic memory element, etc. In another embodiment, the computer program may also be transmitted and distributed in a form of a signal on a network medium, downloaded and installed through the communication portion 1609, and/or installed from the removable medium 1611. The program code contained in the computer program may be transmitted by any suitable network medium, including but not limited to: wireless, wired, etc., or any suitable combination thereof.

In the embodiments, the computer program may be downloaded and installed from the network through the communication portion 1609, and/or installed from the removable medium 1611. The computer program, when executed by the processor 1601, performs the above-mentioned functions defined in the system of embodiments of the present disclosure. According to embodiments of the present disclosure, the system, the apparatuses, devices, the modules, the units, etc. described above may be implemented by the computer program module.

According to embodiments of the present disclosure, the program code for executing the computer programs provided by embodiments of the present disclosure may be written in any combination of one or more programming languages. Specifically, the computing programs may be implemented using a high-level procedure and/or an object-oriented programming language, and/or an assembly/machine language. The programming language includes, but is not limited to Java, C++, python, "C" language or a similar programming language. The program code may be completely executed on a user computing device, partially executed on a user device, partially executed on a remote computing device, or completely executed on the remote computing device or a server. In a case of involving the remote computing device, the remote computing device may be connected to the user computing device through any kind of network, including a local area network (LAN) or a wide area network (WAN), or may be connected to an external computing device (for example, connected through the Internet using an Internet service provider).

The flowcharts and block diagrams in the accompanying drawings illustrate possibly implemented architectures, functions and operations of the systems, methods and computer program products according to various embodiments of the present disclosure. In this regard, each block in the flowcharts or block diagrams may represent a module, a program segment, or at least one of a code. The above-mentioned module, program segment, or at least one of the code contains one or more executable instructions for realizing specified logic functions. It should also be noted that in some alternative implementations, functions marked in the blocks may also occur in a different order from those marked in the accompanying drawings. For example, two consecutive blocks may actually be performed in parallel, and sometimes they may be performed in a reverse order, which depends on the functions involved. It should also be noted that each block in the block diagrams or flowcharts and a combination of blocks in the block diagrams or flowcharts may be implemented by a dedicated hardware-based system that performs specified functions or operations, or by a combination of a dedicated hardware and computer instructions.

Those skilled in the art will appreciate that various combinations and/or incorporations of features recited in various embodiments and/or claims of the present disclosure may be made, even if such combinations or incorporations are not explicitly recited in the present disclosure. In particular, without departing from the spirit and principles of the present disclosure, various combinations and/or incorporations of the features recited in the various embodiments and/or claims of the present disclosure may be made. All of the combinations and/or incorporations fall within the scope of the present disclosure.

Embodiments of the present disclosure have been described above. However, these embodiments are for illustrative purposes only, and are not used to limit the scope of the present disclosure. Although various embodiments have been described separately above, this does not mean that the measures in various embodiments may not be used advantageously in combination. The scope of the present disclosure is defined by the appended claims and their equivalents.

Without departing from the spirit and principles of the present disclosure, those skilled in the art may make various alternatives and equivalent substitutions, and these alternatives and modifications should all fall within the scope of the present disclosure.

What is claimed is:

1. A method of training a radiation image recognition model online, the radiation image recognition model being applied to a radiation inspection system, the radiation inspection system being arranged at a radiation inspection site, preset data being pre-stored in the radiation inspection system, the preset data comprising a first radiation image, and the method comprising:

collecting a second radiation image at the radiation inspection site;

labeling the second radiation image online to form on-site collected data having a second labeling information, wherein the second labeling information is an incomplete labeling information of the second radiation image, and the second labeling information is configured to indicate at least one of objects of interest in the second radiation image, wherein the incomplete labeling information refers to the labeling information indicates only at least one of objects of interest in a labeled image, but not all objects of interest in a labeled image;

synthesizing the preset data and the on-site collected data online to form a training data set; and training the radiation image recognition model online using the training data set, wherein the first radiation image in the preset data comprises at least one of following:

the first radiation image in the preset data has a first labeling information, and the first labeling information is configured to indicate all objects of interest in the first radiation image;

the first radiation image in the preset data does not comprise any object of interest; and the preset data comprises a plurality of first radiation images, at least one of the plurality of first radiation images has the first labeling information, the first labeling information is configured to indicate all objects of interest in the first radiation image, and at least one of the plurality of first radiation images does not comprise any object of interest.

2. The method according to claim 1, wherein the synthesizing the preset data and the on-site collected data online to form a training data set comprises:

extracting an object of interest corresponding to the second labeling information from the second radiation image; and synthesizing the second labeling information and the extracted object of interest into the first radiation image comprised in the preset data to form the training data set.

3. The method according to claim 1, wherein the first labeling information is configured to indicate all objects of interest of all categories in the first radiation image; and the second labeling information is configured to indicate objects of interest of at least one of categories in the second radiation image, or the second labeling information is configured to indicate at least one of objects of interest of at least one of categories in the second radiation image.

4. The method according to claim 1, wherein the first labeling information comprises at least one first labeling box labeled in the first radiation image and at least one first tag labeled in the first radiation image, the at least one first labeling box is configured to indicate locations of all objects of interest in the first radiation image, and the at least one first tag is configured to indicate categories of all objects of interest in the first radiation image.

5. The method according to claim 4, wherein the second labeling information comprises at least one second labeling box labeled in the second radiation image and at least one second tag labeled in the second radiation image, the at least one second labeling box is configured to indicate a location of at least one of objects of interest in the second radiation image, and the at least one second tag is configured to indicate a category of at least one of objects of interest in the second radiation image.

6. The method according to claim 2, wherein the synthesizing the second labeling information and the extracted object of interest into the first radiation image comprised in the preset data to form the training data set comprises:

inserting the extracted object of interest into the first radiation image to form a training radiation image;

generating a third labeling box and a third tag in the training radiation image, wherein the third labeling box is generated according to the second labeling box, and the third tag is identical to the second tag and configured to indicate a category of an object of interest surrounded by the third labeling box; and forming the training data set according to the training radiation image having the first labeling box, the first tag, the third labeling box and the third tag.

7. The method according to claim 6, wherein the first radiation image comprises a transparent region and an opaque region, and the inserting the extracted object of interest into the first radiation image to form a training radiation image comprises:

selecting a region meeting an insertion requirement from the transparent region of the first radiation image as at least one candidate insertion region;

selecting one of the at least one candidate insertion region as an insertion region according to a data synthesis rule; and inserting the extracted object of interest into the insertion region.

8. The method according to claim 7, wherein the meeting an insertion requirement comprises that: an area or a volume of the candidate insertion region is greater than or equal to an area or a volume of a to-be-inserted object of interest.

9. The method according to claim 7, wherein the data synthesis rule comprises that: in the first radiation image, a concealment degree of a surrounding object to the candidate insertion region meets a specified requirement.

10. The method according to claim 1, wherein the method further comprises:

forming a quasi-complete labeling information of the second radiation image according to the incomplete labeling information of the second radiation image; and determining the second radiation image having the quasi-complete labeling information as a portion of the training data set.

11. The method according to claim 10, wherein the forming a quasi-complete labeling information of the second radiation image according to the incomplete labeling information of the second radiation image comprises:

detecting an unlabeled object of interest in the second radiation image;

calculating a similarity between the unlabeled object of interest and an object of interest corresponding to the second labeling information; and labeling, in response to the similarity meeting a similarity threshold requirement, the unlabeled object of interest using the second labeling information, so as to form the quasi-complete labeling information of the second radiation image.

12. The method according to claim 7, wherein the inserting the extracted object of interest into the first radiation image to form a training radiation image comprises:
performing a data augmentation operation on the extracted object of interest to form augmentation data, wherein a number of extracted objects of interest is n, and a number of objects of interest comprised in the augmentation data is N, N=m*n, where n is a positive integer greater than or equal to 1, and m is a positive integer greater than or equal to 2; and
inserting the N objects of interest comprised in the augmentation data into the first radiation image respectively, so as to form a plurality of training radiation images.

13. The method according to claim 12, wherein the data augmentation operation comprises at least one selected from: a flip operation, a rotation operation, and a numerical dithering operation.

14. The method according to claim 1, wherein the training data set comprises a first training data subset and a second training data subset, the first training data subset and the second training data subset have different data distributions, the first training data subset comprises the preset data, and the second training data subset comprises an unlabeled third radiation image collected at the radiation inspection site, wherein the method further comprises:
training the radiation image recognition model using the first training data subset; and
training the radiation image recognition model trained by the first training data subset using the second training data subset,
wherein in a process of training the radiation image recognition model trained by the first training data subset using the second training data subset, a distance between the first training data subset and the second training data subset is minimized by adjusting a parameter of a feature layer of the radiation image recognition model.

15. The method according to claim 1, wherein the preset data comprises a typical sample in a radiation inspection, and the typical sample is screened by a genetic method,
wherein the labeling the second radiation image online comprises:
automatically detecting an object of interest of an unknown category in the second radiation image; and
sending a reminder signal, wherein the reminder signal is configured to remind to label the object of interest of the unknown category in the second radiation image,
wherein the training the radiation image recognition model online using the training data set comprises:
training a plurality of alternative models using the training data set;
screening the plurality of alternative models according to a specified index; and
determining one of the plurality of alternative models meeting the specified index as the radiation image recognition model.

16. A method of recognizing a radiation image, the method of recognizing the radiation image being applied to a radiation inspection system, the radiation inspection system being arranged at a radiation inspection site, and the method comprising:
collecting a to-be-recognized radiation image at the radiation inspection site;
inputting the to-be-recognized radiation image into a radiation image recognition model, wherein the radiation image recognition model is trained according to the method according to claim 1; and
recognizing the to-be-recognized radiation image using the radiation image recognition model.

17. An electronic device, comprising:
one or more processors;
a storage apparatus configured to store one or more programs,
wherein the one or more programs, when executed by the one or more processors, are configured to cause the one or more processors to implement the method according to claim 1,
wherein the electronic device is a radiation inspection device.

18. A non-transitory computer-readable storage medium having executable instructions thereon, wherein the instructions, when executed by a processor, are configured to cause the processor to implement the method according to claim 1.

19. A computer program product stored on a non-transitory computer-readable storage medium comprising a computer program, wherein the computer program, when executed by a processor, is configured to cause the processor to implement the method according to claim 1.

* * * * *